(No Model.) 7 Sheets—Sheet 2.

C. W. ROBISON.
STEAM ENGINE.

No. 517,015. Patented Mar. 20, 1894.

Witnesses:
Fred L. Meyer.
H. D. Kramm

Inventor:
Charles W. Robison
W. V. Efft
atty.

(No Model.)

C. W. ROBISON.
STEAM ENGINE.

No. 517,015. Patented Mar. 20, 1894.

Witnesses:
Fred L. Meyer.
H. D. Kramm

Inventor:
Charles W. Robison
By W. V. Zefft
Atty.

(No Model.)  C. W. ROBISON.  7 Sheets—Sheet 4.
STEAM ENGINE.

No. 517,015.  Patented Mar. 20, 1894.

Witnesses:
Fred L. Meyer.
H. D. Kramm

Inventor:
Charles W. Robison
By W. V. Tefft, Atty.

(No Model.)

C. W. ROBISON.
STEAM ENGINE.

Patented Mar. 20, 1894.

Witnesses:
Fred L. Meyer.
H. D. Kramm

Inventor:
Charles W. Robison
By W. T. Tefft atty.

(No Model.)  
7 Sheets—Sheet 7.

C. W. ROBISON.
STEAM ENGINE.

No. 517,015.  Patented Mar. 20, 1894.

Witnesses:
Fred L. Meyer.
A. D. Kramm

Inventor:
Charles W. Robison
By W. V. Lefft
Atty.

UNITED STATES PATENT OFFICE.

CHARLES W. ROBISON, OF PEORIA, ILLINOIS.

STEAM-ENGINE.

SPECIFICATION forming part of Letters Patent No. 517,015, dated March 20, 1894.

Application filed February 9, 1893. Serial No. 461,567. (No model.)

*To all whom it may concern:*

Be it known that I, CHARLES W. ROBISON, a citizen of the United States, residing at Peoria, in the county of Peoria and State of Illinois, have invented certain new and useful Improvements in Steam-Engines; and I do hereby declare that the following is a full, clear, and exact description of the invention, which will enable others skilled in the art to which it appertains to make and use the same.

This invention relates to improvements in steam engines they pertaining more particularly to engines of the automatic class.

Figure 1:
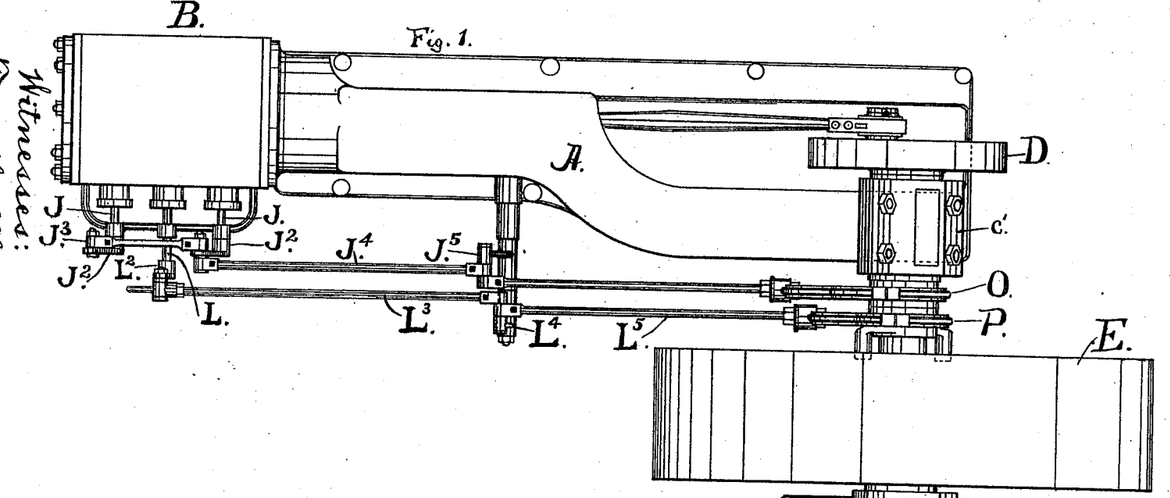
Figure 1 is a plan view of the engine embodying my improvements.

In the drawings the bed of the engine, is as a whole, indicated by A. This bed may be of any preferred form, as concerns the other parts of the invention though for an engine of the style herein shown, a bed of the sort illustrated is preferably employed. By examination of Figs. 13 to 17 in connection with Figs. 1 and 2 the characteristic features of its construction will be readily understood. It is so constructed and its parts are so related that with a small weight of metal, I can provide a support which shall have ample strength for the moving parts. There are two main sections indicated by A' and $A^2$, the former being the one to which the cylinder is secured and the latter being offset somewhat and then extending forward to carry the shaft bearings.

Figure 2:
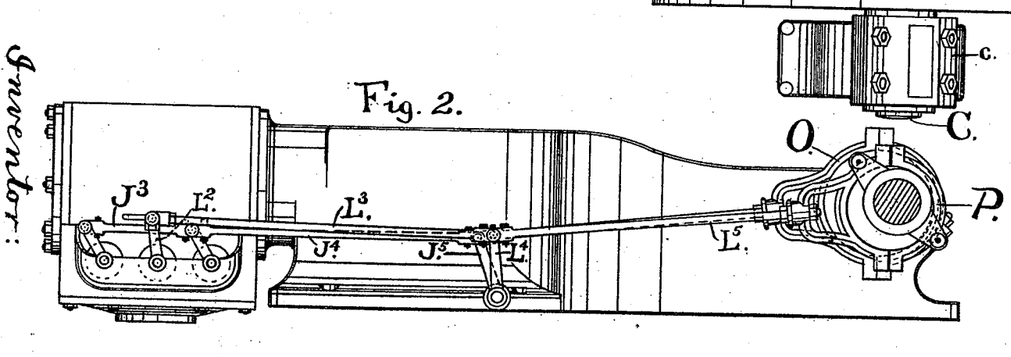
Fig. 2 is a side elevation.

Fig. 2 illustrates the fact that the bed extends down to the floor line or base line as a continuous web. Heretofore engine beds of this class have been so constructed as to require girders and supplementary pieces for guides, braces, &c., and consequently they have been exceedingly heavy and very expensive. At the rear end of section A' there is a flange at $A^2$ for supporting the cylinder. The cross sectional shapes on transverse lines in front of the rear end will be readily understood from Figs. 14, 15, 16, and 17. The metal is so disposed as to form a box or inclosed chamber having walls $a$, $a'$. The guide at $a^2$ is bored out and in this way a simple and inexpensive bed can be produced which will have ample strength. However, as above said, the other parts of the present invention are not limited to this particular form of bed.

B indicates generally a cylinder secured to the bed at one end. At the other end the crank shaft or main shaft C is mounted in suitable bearings, as at $c$, $c'$. The crank disk is indicated by D and the fly wheel by E. This cylinder may also be of any preferred construction so far as concerns the details of the piston chamber, and the means of attachment, &c. Upon one side of it, preferably the under side, there is an extension of steam box indicated by F. adapted to provide a support for the several valves and also to have formed therein the several feed and exhaust ports or ducts.

Figures 3, 8:
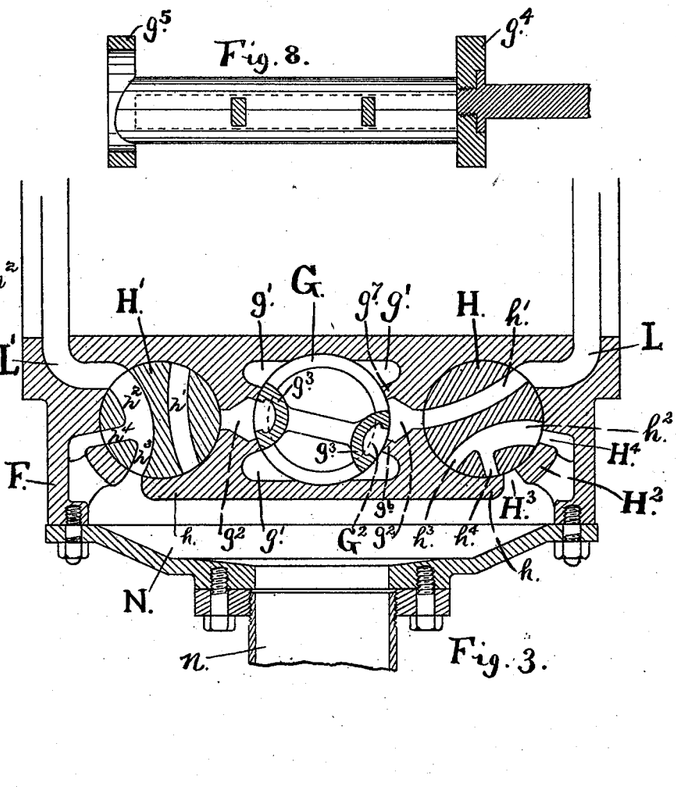
Fig. 3 is a section on the line $x$—$x$, Fig. 5.
Fig. 8 is a section of the auxiliary valve.
Figure 4:
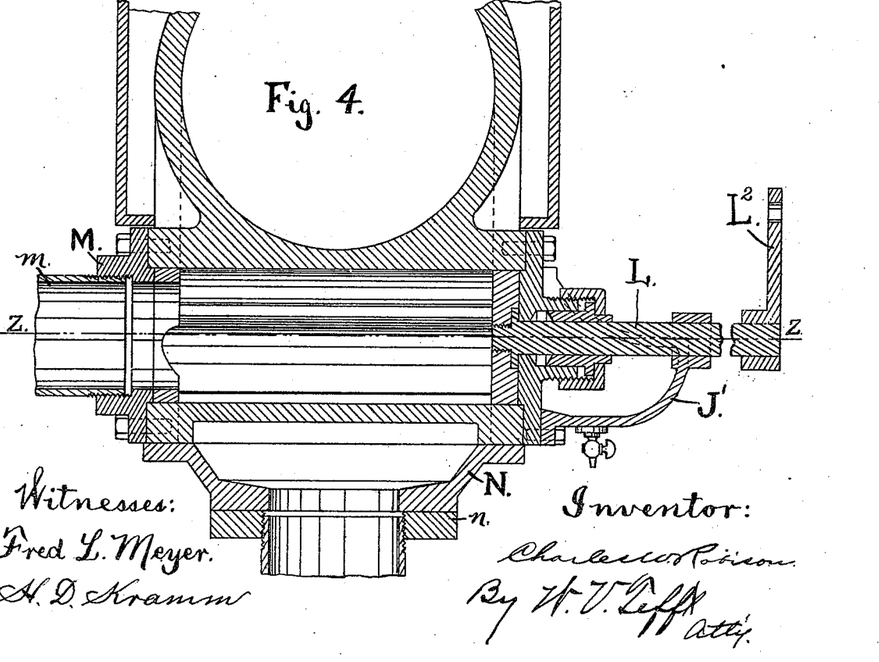
Fig. 4 is a section on the line $y$—$y$, Fig. 5.
Figure 5:
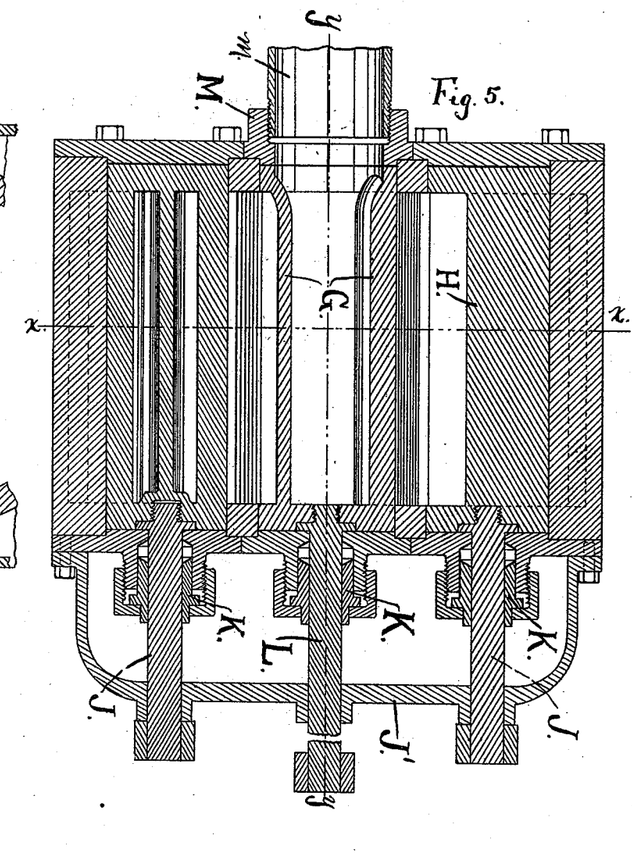
Fig. 5 is a section on the line $z$—$z$ Fig. 4.

The main valves are indicated by H—H' and the auxiliary valve by G. Valve chambers are formed in the ends of projecting part F to receive these main valves H—H' and at the center there is a chamber for the auxiliary valve G, the walls of the end chamber being indicated by $h$. The chamber in which the auxiliary valve G is mounted is of somewhat peculiar conformation, there being laterally projecting extensions $g'$ of this chamber as shown in Fig. 3.

The ports to the cylinder are indicated by L and L'. Between the central auxiliary valve and the end chambers for the main valves there are ports $g^2$.

Figure 6:
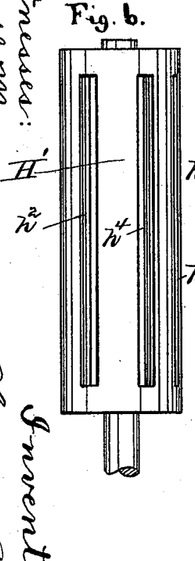
Figs. 6 and 7 are face views of one of the main valves detached.
Figure 7:
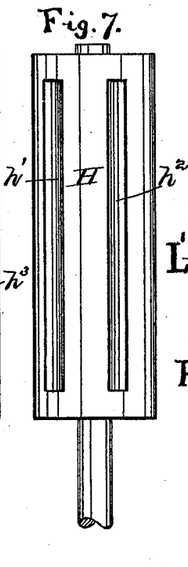
Figure 9:
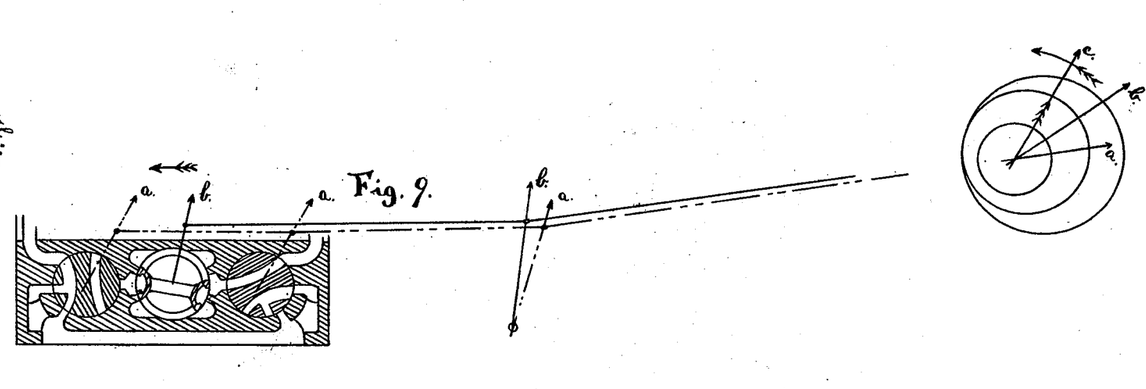
Figs. 9, 10, 11, and 12 are diagrammatic views showing several of the successive positions assumed by the valves and their attached parts.
Figure 10:
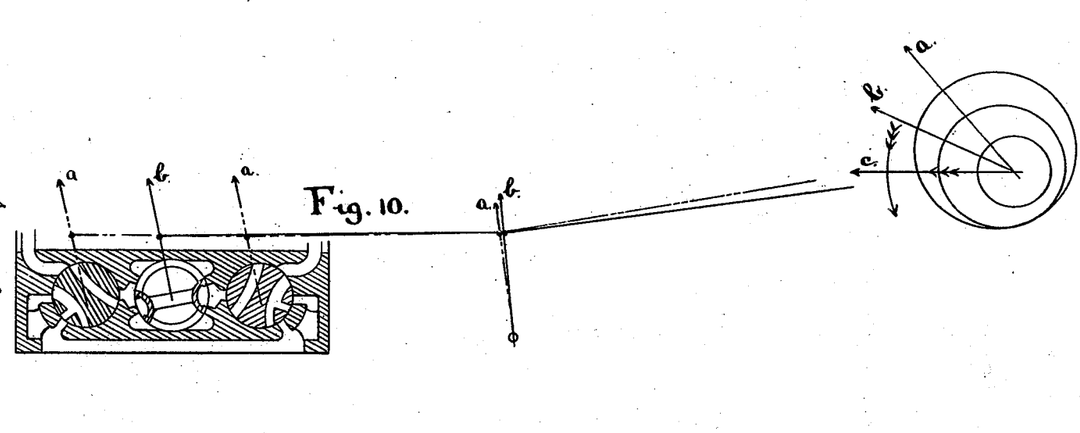
Figure 11:
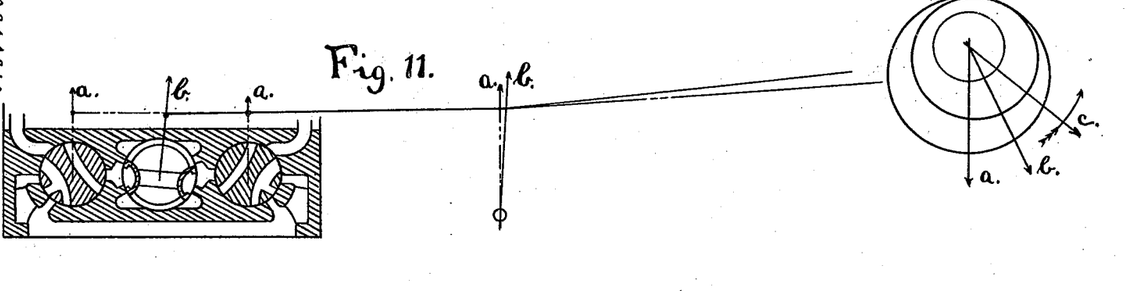
Figure 12:
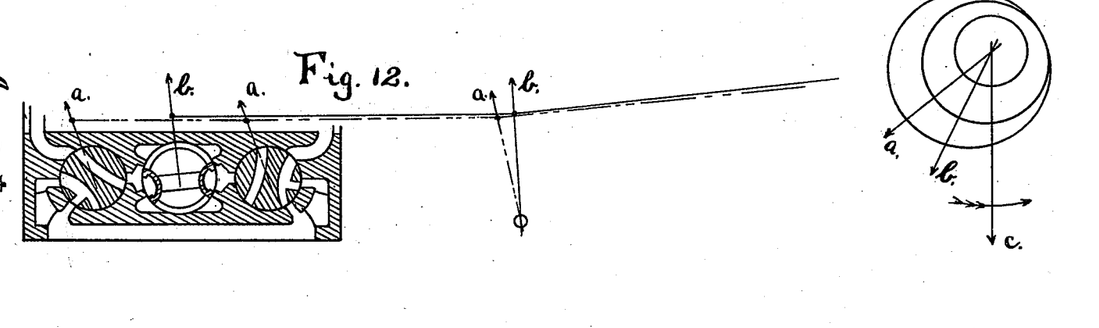
Figures 13, 14, 15, 16, 17:
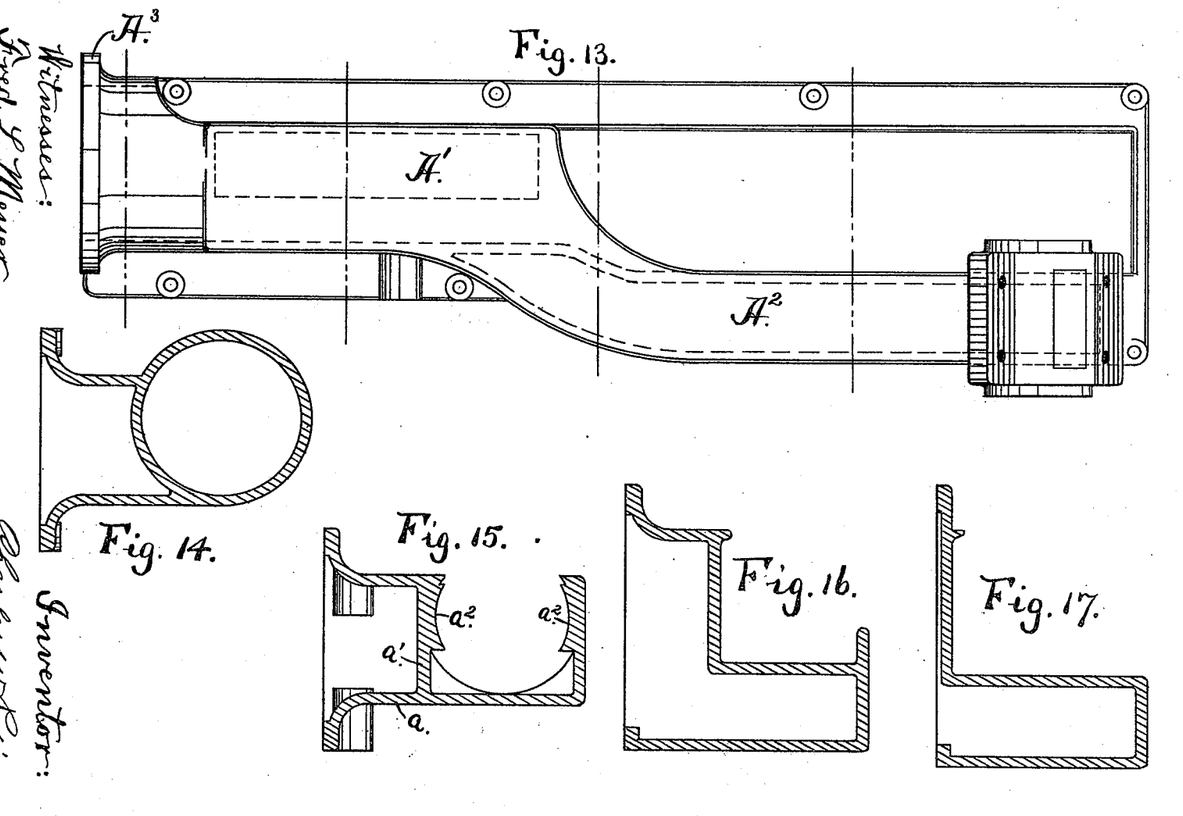
Fig. 13 is a plan view of the bed detached.
Figs. 14, 15, 16, and 17 are respectively cross sections of Fig. 13 taken on the dotted lines indicated thereon.
Figure 18:
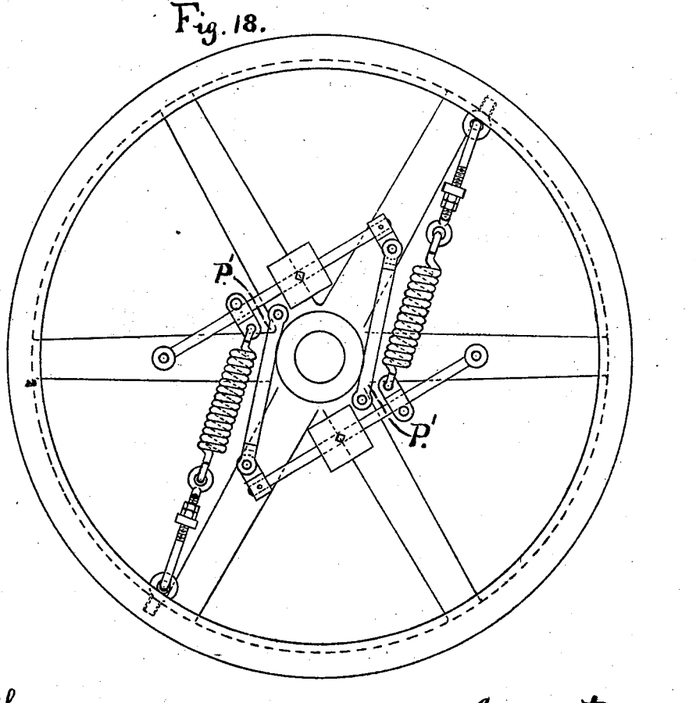
Fig. 18 shows governor.
Figure 19:
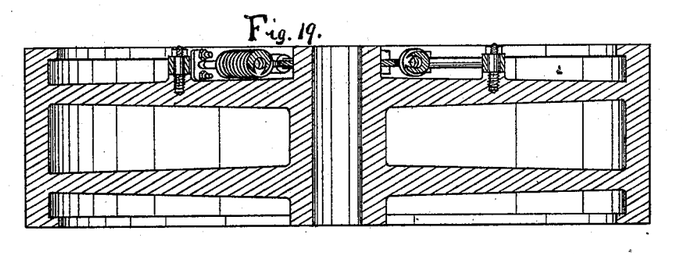
Fig. 19 shows section of governor.

The valves H and H' are illustrated detached from different points of view in Figs. 6 and 7. Each is formed with a passage way or port $h'$ which extends from one side thereof to the other and from a point near one end to a point near the other end. Then on the other side of the center, longitudinally, it is provided with a port or steam passage having one port indicated by $h^2$ preferably terminating in two branches, $h^3$ and $h^4$.

Each of the valves H, H' is constructed with the above described features and is mounted in one of the aforesaid chambers in the steam box or extension projecting down from the cylinder and at one end has an outwardly extending rocker shaft J which passes through one of the head pieces $J^3$ and also through a box on a supplemental bearing bar or plate J', there being a stuffing box at K to insure a steam tight joint around this rocking shaft.

The auxiliary valve G is mounted and supported in a way substantially similar to that above described, that is to say it is mounted in the central chamber in the steam box or extension projecting from the cylinder and has an outwardly extending rocker shaft L provided with a stuffing box K and with a bearing in the supporting plate or bar J', this part serving also as a drip pan.

By an examination of the drawings, it will be seen that the auxiliary valve G consists essentially of two cut-off parts $g^3$. In the construction shown these are cast integrally together and with a circular disk or end plate $g^4$ at one end and a ring $g^5$ at the opposite end. The cut-off parts $g^3$ are each formed with a recess or steam passage $G^2$ which is somewhat wider than the seat $g^6$ $g^7$ adjacent to it, the seat being provided by properly shaping the metal of the extension F or a steam box.

At M there is a tubular retaining ring for the valve G, and to it the steam pipe $m$ is connected centrally so that the steam enters directly to the interior of valve G. When the ports $g^2$ and $l$ coincide with port $h$ in the valve the steam can pass to the cylinder, the valve G being properly situated. When it is required to reduce back pressure as much as possible the steam port $h'$ in the main valve is of a cross area somewhat less than that of the port $l$; and the exhaust port $h^2$ is of a larger cross area. The relative capacity of the ports under such proportions and their actions being shown in Fig. 3. The exhaust passage on the right in said figure is larger than the steam passage and therefore there is a guarantee against back pressure. In order to have a quick exhaust the port $h^2$ is, as above described, forked, as at $H^3$ $H^4$, and use is made of the seat $H^2$. When the exhaust is full the branch ports $h^3$ and $h^4$ coincide with ports $H^3$ and $H^4$. The face area of the seat $g^6$ and $g^7$ is less than the peripheral area of the chambers $G^2$ in the cut-off ports $g^3$ of valve G; and therefore the full pressure of the steam is let on more quickly by a slight motion of the auxiliary valve, and the governor can vary the amount of steam much more quickly than is the case where a single port and single cut-off surfaces are used in the place of the double rotary cut-off surface and a double stationary cut-off surface as at $g^6$ and $g^7$.

The auxiliary valve G is so open that the steam readily passes at all times to the chamber projection $g'$ and from this it is ready to pass around the seat $g^6$ $g^7$.

The exhaust chamber is closed upon one side (the bottom as herein illustrated) by the closing cap N with which the exhaust pipe $n$ communicates.

The above described rocker shafts J, J are provided with crank arms $J^2$ which are connected with a link $J^3$. From this link there extends forward a second link $J^4$ which is pivoted to an arm or link $J^5$. The lower end is pivotally mounted on a stud or bar secured to the bed, and at the upper end is connected by the pitman with the eccentric O secured to the engine shaft C.

The rocker shaft L of inlet Z is provided with a crank $L^2$ which at the upper end is pivoted to a link $L^3$ and this link is at its forward end supported upon a vibrating arm or link $L^4$ and is connected to a pitman $L^5$. The latter is actuated by an automatically adjustable eccentric P mounted loosely upon the engine shaft. It is connected to a governor in such a way as to shift in one direction or the other to correspond to the speed of the engine. Any suitable governor may be employed, though at present I prefer one more or less of the character herein illustrated, having parts secured to the fly wheel of the more or less common form and comprising links P' P'. These links are pivoted to the eccentric at points diametrically opposite across the shaft. When the speed of the engine increases the governor throws the eccentric in such a way as to effect the movement of the inlet valve in a manner that causes it to shut off the steam quicker than is the case when the engine is running at its normal speed.

One of the objects of the present invention is to provide a governing mechanism in connection with the steam valve, which shall be as simple as possible in construction, and yet quick and accurate in operation. I obviate entirely the necessity of the numerous parts which have been heretofore used in engines of this sort, for governing the movement of the steam valve, such as ordinary centrifugal ball governor together with its belt wheel, and the bevel gearing for driving and the link mechanism for connecting it to the valve. By having the parts, which I have termed "valve bars" formed each with two cut-off surfaces, and by having the valve surfaces of the chest reduced in width at the sides of the steam port, I am enabled to permit the full entrance of the steam with much less rotary motion of the valve than is the case where the latter is formed with a single cut-off surface and the necessary movement of the valve is thus reduced and the action of the governor can be applied much more quickly and delicately.

By examining Figs. 9 to 12 the movements and the successive positions of the three valves in relation to each other, and in relation to the several ports will be readily understood. The exhaust valves move through relatively large arcs, which movements are constant because of their eccentric being fixed on the engine shaft, though the parts can be so adjusted that these movements shall be whatever may be desired, either to give more or less lead or no lead on the exhaust side to each or both valves. On the other hand, it will be seen that the movement of the steam valves is necessarily and instantly affected by any variations in the speed of the engine shaft, and as the valve bars are formed each with two cut-off surfaces with a depression, or steam passage way, between them, it is not necessary for this valve to rock through more than a small arc in order to admit full steam. The peripheral movement of the valve is practically constant, but the length of the time during which it opens the steam ports through the exhaust valves, is varied and therefore although the pressure of the steam remains practically constant, the volume of it will be modified. It will be seen that each of the main valves is at once a steam valve and an exhaust valve. The auxiliary valve acts to govern the admission of the steam to the steam port in the main valve. It is not necessary that both of the parts of the auxiliary valve should be integral or rigidly connected together, as is the case herein; for substantially the same results can be attained if this part of the mechanism be divided and made in two independently mounted parts. And in the case of engines of large stroke such divisions of the parts are advisable in order to have the cut-offs as near to the clearance parts of the cylinder as possible to prevent the reducing of the pressure and also reducing the amount of clearance.

What I claim is—

1. In an engine the combination with the cylinder and the engine shaft, of two main valves, an eccentric on the engine shaft actuating said valves, a steam valve situated between the main valves and adapted to admit steam to both of them, a supplemental eccentric on the engine shaft for actuating said steam valve, and a governor secured to the shaft for automatically adjusting said eccentric, substantially as set forth.

2. In an engine, the combination with the cylinder and the engine shaft of two main valves, each provided with a steam port, and an exhaust port, and an independently actuated steam valve adapted to deliver steam alternately to the steam ports in said main valves, substantially as set forth.

3. The combination with the engine shaft and the cylinder, of the main valves provided with steam ports and an independent steam valve having two valve bars respectively adapted to open and close the steam ports in the main valves alternately, and means for automatically adjusting the throw of the steam valve, substantially as set forth.

4. The combination with the engine shaft, of the main valves each having a steam port and an exhaust port of larger dimensions than the steam port, the steam valve having steam ports delivering alternately to the main valves, and a governor mounted on the engine shaft for regulating the movements of the steam valve.

5. The combination with the cylinder and the engine shaft of the rocking main valves, each having a steam port and an exhaust port and the rocking steam valve having two valve bars one for each main valve, and each of the said bars having two cut-off surfaces, substantially as set forth.

6. The combination with the cylinder and the engine shaft, and the rocking main valve having a feed port and an exhaust port and the rocking steam valve having a valve bar with two cut-off surfaces, an eccentric mounted rigidly on the engine shaft for actuating the main valve, and the automatically adjustable eccentric on the engine shaft for actuating the steam valve whereby the steam entering the main valve will always approximate full pressure, but have the quantity closely regulated directly from the engine shaft substantially as described.

7. In an engine, the combination with one or more rocking main valves each having a steam passage and an exhaust passage, of an automatically adjustable steam valve, feeding steam to both main valves, substantially as described and independent eccentrics on the engine shaft for actuating the said main and steam valves, respectively, all substantially as set forth.

8. In an engine, the combination with the rocking steam valve, and the rocking main valve provided with a steam port whereby back pressure is reduced and sudden exhaust permitted and with a two-part exhaust port, all substantially as set forth.

9. The combination with the main valves, each having a steam port and an exhaust port, of the steam valve having for each steam port in the main valves two relatively narrow cut-off surfaces, the steam chamber having two relatively narrow cut-off surfaces opposing those aforesaid, all substantially as set forth.

10. The combination with the cylinder and the steam chest, of the rocking steam valve having a double port, and the main valve having a relatively reduced steam port $h'$, and a relatively enlarged exhaust port $h^2$, whereby full pressure of steam can be exerted and back pressure reduced, substantially as set forth.

11. In an engine, the herein described rocking valve auxiliary to the main valve, it having a steam entrance at the end and a double cut-off surface for the steam port to the cylinder, in combination with the valve chest having two supply ducts as at $g'$, $g'$, receiving the steam from the interior of the steam valve and delivering simultaneously to the steam port $g^2$, substantially as set forth.

12. In an engine, the herein described valve having the steam port and an exhaust port which is divided transversely into two parts, in combination with the steam chest having the ports I, $H^3$ and $H^4$, substantially as set forth.

In testimony whereof I affix my signature in presence of two witnesses.

CHARLES W. ROBISON.

Witnesses:
W. V. TEFFT,
H. D. KRAMM.